United States Patent [19]

Tharman

[11] Patent Number: 4,915,068

[45] Date of Patent: Apr. 10, 1990

[54] INTERNAL COMBUSTION ENGINE WITH INTEGRAL STATOR AND REGULATOR

[75] Inventor: Paul A. Tharman, Milwaukee, Wis.

[73] Assignee: Briggs & Stratton Corporation, Wauwatosa, Wis.

[21] Appl. No.: 327,510

[22] Filed: Mar. 22, 1989

[51] Int. Cl.⁴ .............................................. F02P 1/00
[52] U.S. Cl. ............................. 123/149 R; 123/149 D; 123/647; 310/68 D
[58] Field of Search .................. 123/2, 149 R, 149 D, 123/198 R, 635, 647, 599; 310/68 D

[56] References Cited

U.S. PATENT DOCUMENTS 3,673,490 6/1972 Magrane ......................... 123/149 D
4,259,938 4/1981 Johansson ............................ 123/599

*Primary Examiner*—Noah P. Kamen
*Attorney, Agent, or Firm*—Andrus, Sceales, Starke & Sawall

[57] ABSTRACT

An alternator assembly for an internal combustion engine includes a regulator whose individual circuit components are mounted directly on the stator of the alternator assembly. The regulator may be in the form of discrete components or integrated circuit chips. The components of the regulator circuit may be mounted to the stator by fasteners or by an adhesive resin such as epoxy.

24 Claims, 1 Drawing Sheet

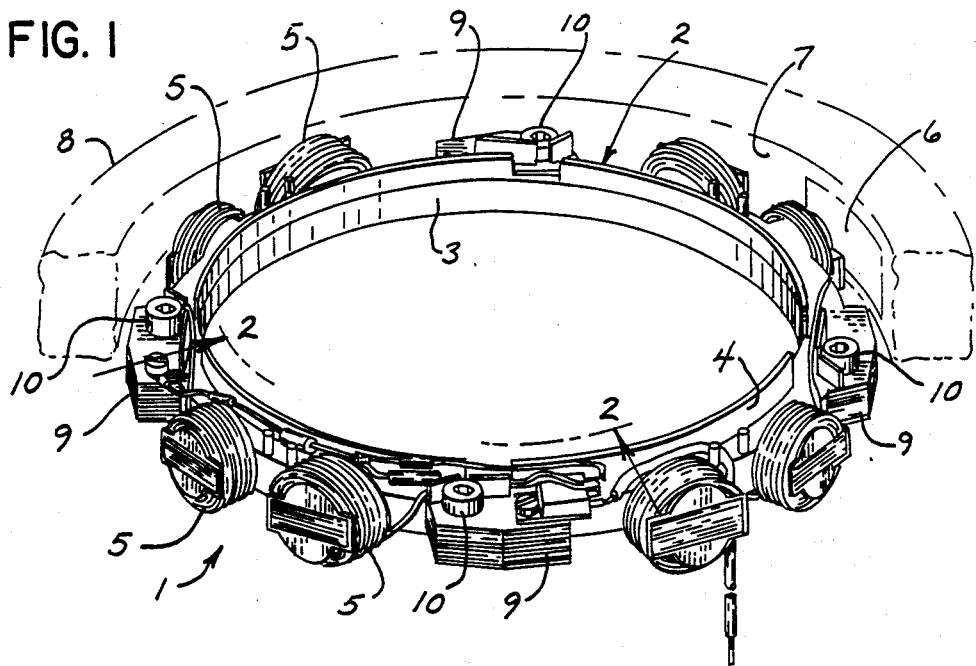

INTERNAL COMBUSTION ENGINE WITH INTEGRAL STATOR AND REGULATOR

BACKGROUND AND SUMMARY OF THE INVENTION

The present invention relates to an internal combustion engine, and more particularly to an alternator assembly for an internal combustion engine.

The regulator of an alternator assembly used in connection with internal combustion engines typically functions to rectify current produced by the alternator assembly from alternating current to direct current so that the battery used on a vehicle such as an automobile, riding lawn mower, airplane, tractor or the like, may be recharged. Thereafter, the regulator functions to prevent the battery from overcharging. The battery also functions to feed direct current directly to the headlights or other lamps of a vehicle as well as other accessories such as a radio, solenoid, brakelights, and the like.

Normally, the regulator comprises a plurality of individual discrete electrical components combined to form a desired circuit and contained within a housing or casing which is mounted externally of and separately from the alternator assembly. The regulator may be found either on the vehicle frame (automobile, riding mowers, airplanes, tractors, etc.) or on the engine itself. As a result, regulators require their own individual assembly time and labor. Oftentimes regulators may also require special mounting brackets and/or fasteners depending upon the particular engine design which increases the relative cost of such a device.

In accordance with the present invention, the individual discrete electrical components of an engine monitoring circuit, preferably a regulator, are mounted directly on the stator of the alternator assembly for an internal combustion engine. The advantages of mounting the circuit components, particularly the regulator circuit components, directly on the stator include numerous cost advantages such as the savings on fasteners, assembly time and labor, elimination of special mounting brackets as well as special blower housings (required for regulator mounting in small engine applications such as lawn mowers), elimination of unnecessary wires and connectors as well as the time and labor to assemble such components, and elimination of the regulator case and potting material. Additionally, one particular advantage of the present invention is that it reduces the overall contour of the engine, especially its height or width, since a separate case or module housing for example the regulator circuit or charge indicator circuit need not be provided exteriorly of the engine. Furthermore, higher reliability results due to fewer connections and wires, and high quality is maintained due to cooler operation of the circuit, especially in small engine applications, e.g. forced air from the flywheel cools the stator and regulator components versus prior methods involving heat conduction through the regulator case or housing.

The circuit components may be assembled to the stator with fastener means such as rivets, bolts or screws or by adhesive means such as epoxy resin covering at least a portion of the circuit components. The use of epoxy also eliminates excessive vibration of the circuit components thus eliminating failures due to vibration breakage. Additionally, the circuit itself may be composed of a plurality of discrete components or integrated circuit chips, and may comprise any type of engine monitoring circuit employed with an internal combustion engine. Preferably, the present invention is employed with small internal combustion engines of the type utilized in lawn and garden equipment having both half wave as well as full wave regulator/stator circuits. The regulator may also incorporate a charge indicator circuit. Such a circuit is used to turn on a red bulb when the battery voltage is below some set voltage (for example 12 volts) or a green bulb when the battery voltage is above the set voltage.

Other engine monitoring circuits may also be mounted directly on the stator. Such circuits may include, for example, safety interlock circuits, oil pressure start circuits, tachometer circuits, engine hour metering circuits, overheat circuits, and other similar circuitry.

BRIEF DESCRIPTION OF THE DRAWINGS

The drawings illustrate the best mode presently contemplated of carrying out the invention.

In the drawings:

FIG. 1 is a perspective view of a stator of an alternator assembly for an internal combustion engine incorporating the regulator of the present invention;

FIG. 2 is an enlarged fragmentary side view in elevation of the stator along the plane of the line 2—2 in FIG. 1 illustrating the location of the components of the regulator;

FIG. 3 is a schematic circuit diagram of a half wave regulator/stator circuit; and FIG. 4 is a view similar to FIG. 2 illustrating a second embodiment wherein the components of the regulator are integrated circuits.

DESCRIPTION OF THE PREFERRED EMBODIMENTS

Referring now to the drawings, FIG. 1 illustrates a stator generally designated by the numeral 1 of an alternator assembly for an internal combustion engine (not shown). It should specifically be understood that the term "alternator assembly" as used herein encompasses not only alternators but also generators used in connection with internal combustion engines. Additionally, although FIG. 1 illustrates one design of a stator employed with such an alternator assembly, it is to be understood that the present invention may be employed with numerous stator designs and FIG. 1 is illustrative of only one such design.

Stator 1 includes a stationary annular ring member 2 having an inner radial surface 3 and an outer radial surface 4. Stator 1 is typically mounted in a stationary position disposed concentric with the axis of rotation of an engine's crankshaft (not shown). As shown best in FIG. 1, stator 1 includes a plurality of spaced windings or wire coils 5 arranged circumferentially about outer surface 4. Coils 5 cooperate in the conventional manner with a moving magnetic field for producing an electric output current therein. The magnetic field is typically provided by a plurality of rotating magnets 6 (only one of which is shown in FIG. 1) arranged in opposing relation to wire coils 5 and disposed concentric therewith. As shown best in FIG. 1, rotating magnets 6 are mounted on an inner surface 7 of rotating flywheel 8 (shown in phantom lines). Flywheel 8 is connected to the engine's crankshaft in any conventional manner and typically is in the shape of a cup so that magnets 6 may be disposed opposite wire coils 5, as is conventional. Stator 1 also includes four lands 9 projecting from outer surface 4 and integral therewith which provide a means for mounting stator 1 in a stationary position on the engine by means of screws 10.

Referring now to FIG. 3, the alternator assembly includes a regulator whose schematic circuitry is designated by the numeral 11. Regulator 11 may be of any conventional design, and may be in the form of discrete components (FIG. 3) or integrated circuit chips (FIG. 4). Regulator 11, as illustrated in FIG. 3, is for illustrative purposes only, and illustrates a schematic diagram for a half wave regulator/stator circuit incorporating a charge indicator circuit, which is an optional add-on circuit in many regular circuits. More particularly, FIG. 3 illustrates circuit means including a plurality of discrete components connected to a wire coil 5 to regulate the output current therein. More specifically, the discrete components include a one hundred volt twelve amp RMS SCR device 12 connected to one terminal of coil 5 together with a one amp, six hundred volt diode 13, a second one amp six hundred volt diode 14 and a fourteen volt, one watt zener diode 15 connected to the other terminal of coil 5. Additionally, a one hundred ohm one watt resistor 25 is connected across SCR 12 and diode 13 so as to be connected on one side between the anode of SCR 12 and coil 5 and its other side between diode 13 and diode 14. As noted previously, the circuit illustrated in FIG. 3 is conventional and described for illustrative purposes only since other designs are possible. One such alternate design is illustrated in FIG. 4 where a portion of the discrete components of the regulator circuit of FIG. 3 has been replaced by integrated circuit chips 16 and 26 mounted in receptacles 27 and 28, respectively.

Referring now to FIG. 2, there is illustrated the manner in which the components of regulator 11 are mounted directly on stator 1. As illustrated, components 12-15 and 25 are arranged longitudinally with respect to one another and mounted so as to engage or bear against outer surface 4 of stator 1. In order to securely mount the components of regulator 11 on stator 1, one end of the regulator circuit is attached to a terminal 17 which in turn is mounted to one of the lands 9 by means of a screw fastener 18. The other end comprising the tab of SCR 12 of the regulator circuit is similarly mounted to another land 9 by a screw fastener 20. An adhesive such as an epoxy resin 21 may also be employed with or without fasteners 18, 20 to mount regulator 11 to stator 1. Epoxy 21 not only adhesively attaches the components of regulator 11 to outer surface 4 of stator 1, but also eliminates vibration of the various components so as to prevent vibration breakage of the components or wires therebetween.

As illustrated in FIG. 3, regulator 11 includes a polarized plug 22 for connecting the output current from coils 5 to a charge indicator bulb 24 which is controlled in a conventional manner by a charge indicator circuit 19. Circuit 19 is a standard optional add-on circuit readily available from numerous sources such as Wells Corp. or Tympanium Corp., as is well known in the art. Plug 22 is polarized to prevent improper connections. Thus, plug 22 represents the only external connection from stator 1. As is typical, the output current from coils 5 as regulated by regulator 11, may be employed to provide battery charging current and therefore one terminal of the two connector plug leads to battery 23. The other terminal of plug 22 feeds directly to charging indicator bulb 24. Other accessories such as headlamp 29 can be connected directly to the battery 23 or connected through a switch 30.

It should be noted that other engine monitoring circuits may also be mounted directly on stator 1 in addition to regulator circuit 11. Such circuits may include, for example, safety interlock circuits, oil pressure start circuits, tachometer circuits, engine hour metering circuits, overheat circuits, and other similar circuitry. Safety interlock circuits are well known in the art and include those that kill the engine of a lawn mower upon releasing the bail of a walk behind mower or upon getting off the seat of a riding mower. A typical example is shown in Kronich et al U.S. Pat. No. 4,394,893. Oil pressure start circuits are also well known in the art and include those that kill the engine upon sensing low oil pressure, but allow restarting when normal oil pressure is sensed. Tachometer circuits are also well known and typically comprise those that sense and display engine speed. Engine hour metering circuits are well known and are used to count and display the number of hours an engine has actually been in operation. Finally, overheat circuits are also well known and are typically used to shut down or kill an engine or turn on a warning red light when an engine runs hotter than a desired temperature.

An alternator assembly for an internal combustion engine has been illustrated and described that includes a regulator whose individual components are mounted directly on the stator of the alternator assembly. As is readily apparent, various modifications and/or substitutions of the specific components illustrated and described herein may be made without departing from the scope of the present invention. For example, various types of stators, regulator circuits and other engine monitoring circuits may be employed.

Various modes of carrying out the invention are contemplated as being within the scope of the following claims particularly pointing out and distinctly claiming the subject matter regarded as the invention.

I claim:

1. An alternator assembly for an internal combustion engine, comprising:
   stator means including at least one coil means cooperable with a moving magnetic field for producing an electric output current in said coil means and a stationary annular ring member having an inner radial surface and an outer radial surface;
   regulator means connected to said coil means for regulating said output current; and
   mounting means for mounting said regulator means on said stator means outer radial surface.

2. The alternator assembly of claim 1 wherein said coil means is mounted on said outer surface.

3. The alternator assembly of claim 2 wherein said coil means comprises a plurality of spaced wire coils arranged circumferentially about said outer surface.

4. The alternator assembly of claim 3 wherein said moving magnetic field is provided by a plurality of rotating magnets arranged in opposing relation to said wire coils and concentric therewith.

5. The alternator assembly of claim 4 wherein said rotating magnets are mounted on an inner surface of a rotating flywheel.

6. The alternator assembly of claim 1 wherein said regulator means comprises circuit means including a plurality of discrete components connected to said coil means to regulate said output current.

7. The alternator assembly of claim 6 wherein said discrete components include a plurality of diodes and at least one resistor interconnected by wire members extending therebetween.

8. The alternator assembly of claim 7 wherein said discrete components are arranged longitudinally with respect to one another.

9. The alternator assembly of claim 6 wherein said mounting means comprises fastener means extending into said stator means.

10. The alternator assembly of claim 6 wherein said mounting means comprises resin means covering at least a portion of said circuit means for adhesively attaching said circuit means to said stator means.

11. The alternator assembly of claim 10 wherein said resin means comprises an epoxy material.

12. The alternator assembly of claim 1 wherein said regulator means includes plug connector means for connecting said output current to a desired accessory.

13. The alternator assembly of claim 12 wherein said plug is polarized.

14. The alternator assembly of claim 12 wherein said accessory comprises a battery.

15. The alternator assembly of claim 12 wherein said accessory comprises a lamp.

16. The alternator assembly of claim 1 wherein said regulator means comprises circuit means including at least one integrated circuit chip connected to said coil means to regulate said output current.

17. The alternator assembly of claim 1 wherein said regulator means also includes a charge indicator circuit.

18. An alternator assembly for an internal combustion engine, comprising:
    stator means including at least one coil means cooperable with a moving magnetic field for producing an electric output current in said coil means and a stationary annular ring member having an inner radial surface and an outer radial surface;
    engine circuit means for monitoring a desired engine parameter; and
    mounting means for mounting said engine circuit means on said stator means.

19. The alternator assembly of claim 18 wherein said engine circuit means comprises a regulator circuit connected to said coil means for regulating said output current.

20. The alternator assembly of claim 18 wherein said engine circuit means comprises a safety interlock circuit.

21. The alternator assembly of claim 18 wherein said engine circuit means comprises an oil pressure start circuit.

22. The alternator assembly of claim 18 wherein said engine circuit means comprises a tachometer circuit.

23. The alternator assembly of claim 18 wherein said engine circuit means comprises an engine hour metering circuit.

24. The alternator assembly of claim 18 wherein said engine circuit means comprises an engine overheat circuit.

* * * * *

UNITED STATES PATENT AND TRADEMARK OFFICE
CERTIFICATE OF CORRECTION

PATENT NO. : 4,915,068

DATED : April 10, 1990

INVENTOR(S) : Paul A. Tharman

It is certified that error appears in the above-identified patent and that said Letters Patent is hereby corrected as shown below:

Claim 1, Col. 4, line 52, delete "stator means"; Claim 18, Col. 6, Line 13, delete "stator means" and substitute therefore --- outer radial surface ---.

Signed and Sealed this

Ninth Day of July, 1991

Attest:

HARRY F. MANBECK, JR.

Attesting Officer

Commissioner of Patents and Trademarks